Figure 1:
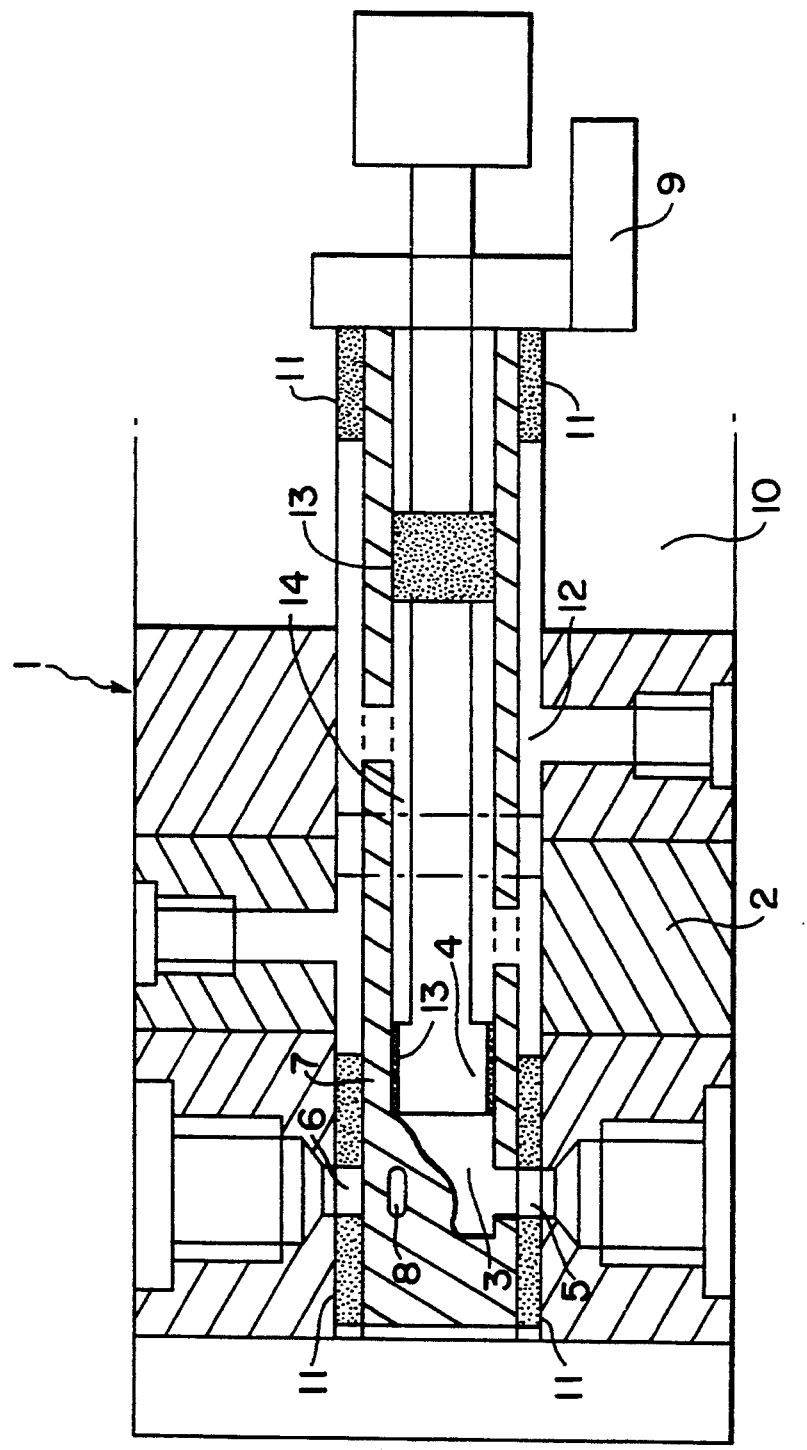

United States Patent [19]

Koskinen et al.

[11] Patent Number: 5,385,992
[45] Date of Patent: Jan. 31, 1995

[54] METHOD FOR THE DOSAGE OF A FLUIDIZED POLYMERIZATION CATALYST INTO A POLYMERIZATION REACTOR

[75] Inventors: Jukka Koskinen, Espoo; Klaus Nyfors, Porvoo; Pauli Leskinen, Helsinki, all of Finland

[73] Assignee: Borealis Holding A/S, Lyngby, Denmark

[21] Appl. No.: 119,150

[22] PCT Filed: Mar. 20, 1992

[86] PCT No.: PCT/FI92/00080
 § 371 Date: Oct. 26, 1993
 § 102(e) Date: Oct. 26, 1993

[87] PCT Pub. No.: WO92/16747
 PCT Pub. Date: Oct. 1, 1992

[30] Foreign Application Priority Data

Mar. 21, 1991 [FI] Finland .................................. 911388

[51] Int. Cl.$^6$ .............................................. C08F 2/14
[52] U.S. Cl. .......................................... 526/79; 526/86
[58] Field of Search ................................. 526/79, 86

[56] References Cited

FOREIGN PATENT DOCUMENTS

| | | |
|---|---|---|
| 0230710 | 3/1910 | Germany . |
| 0248634 | 2/1911 | Germany . |
| 0329400 | 12/1919 | Germany . |
| 0170229 | 1/1960 | Sweden . |
| 8502851 | 7/1984 | WIPO . |
| 8607117 | 12/1986 | WIPO . |

OTHER PUBLICATIONS

Response to Written Opinion of International Preliminary Exam Report, dated May 3, 1993.
International Search Report, Revised Version, dated Jun. 29, 1992.
International Preliminary Exam Report, dated Jun. 22, 1992.
Copy of Written Opinion from International Preliminary Exam Authority, dated Mar. 29, 1993.

*Primary Examiner*—Joseph L. Schofer
*Assistant Examiner*—Tom Weber
*Attorney, Agent, or Firm*—Vickers, Daniels & Young

[57] ABSTRACT

A method is provided for controlling the dosage of a fluidized polymerizing catalyst into a polymerization reactor. The method comprises mixing a solid polymerization catalyst with wax and feeding the flowing catalyst-wax mixture through a pipe to the dosage pump. The inlet opening of the cylinder of the dosage pump is opened to draw catalyst-wax mixture through the inlet opening by means of the back motion of the piston. The inlet opening is then closed and the outlet opening is opened. Flowing catalyst-wax mixture is then pressed from the cylinder through the outlet opening by means of the back motion of the piston. The outlet opening is then closed. Opening and closing of the inlet and outlet openings is carried out by rotating an intermediate pipe arranged between the cylinder and piston so that a transmission opening in the intermediate pipe moves upon either the inlet or outlet opening. The intermediate pipe surface always covers at least one of the inlet or outlet openings.

15 Claims, 3 Drawing Sheets

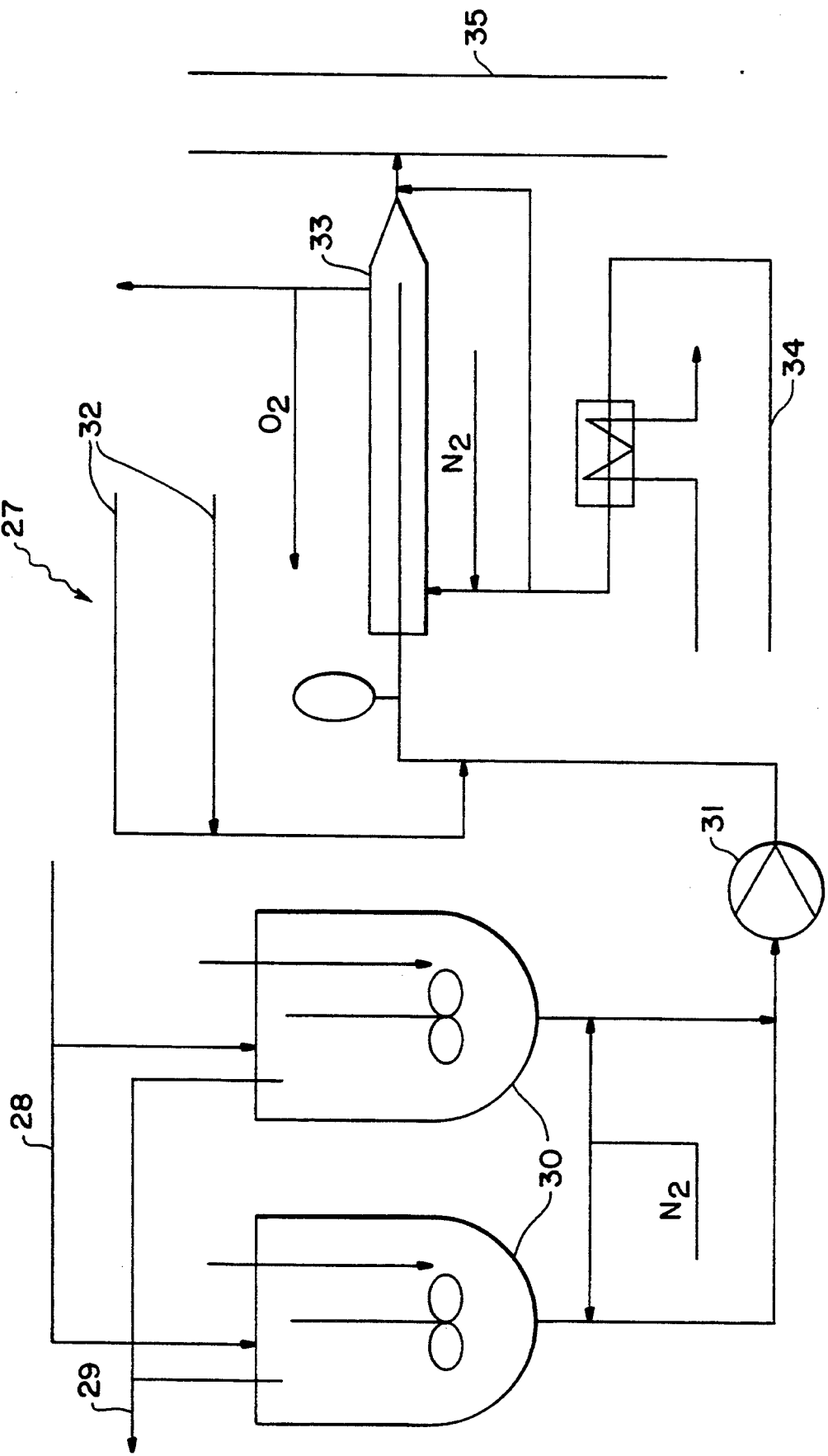

METHOD FOR THE DOSAGE OF A FLUIDIZED POLYMERIZATION CATALYST INTO A POLYMERIZATION REACTOR

The invention relates to a method for the dosage of a fluidized polymerization catalyst into a polymerization reactor.

A requirement of the dosage pump of a fluid substance is that its dosage accuracy is as great as possible simultaneously as it is retaining its reliability of operation. A pump of the above-mentioned type is disclosed in FI patent specification 65127, wherein a double cylinder pump with valves installed in the inlet and outlet openings of the piston-swept space has been used for the synchronized feed of two substances. It has been thought that one of the pump chambers is feeding wax intended for the burnishing of cars.

When feeding by a dosage pump hard flowing material, such as wax or slurry, the combining of the dosage accuracy with the reliability of operation becomes difficult. The dosage accuracy suffers if the hard flowing substance slows down or prevents the cooperation of the valves of the inlet and outlet openings in the piston-swept space of the cylinder chamber. The valves can also be clogged or they can become out of order due to the high pressure used in the tube system.

The drawback of the dosage pump according to the above-mentioned FI patent specification 65127 is, in fact, that the conventional valves of inlet and outlet openings do not operate faultlessly when hard flowing wax is used.

Pumps of the same type are presented e.g. in the publications DE 230,710; 248,634; and 329,400. Of these publications DE publication 248,634 presents a valveless suction and force pump, to the solid pump cylinder (1) of which a cylinder liner (2) has been arranged comprising openings (9 and 12) corresponding to the inlet and outlet openings (25 and 25) of the pump cylinder (1), which at the rotation of the cylinder liner (2) alternatively open and close the inlet and outlet openings.

For the same reason the feeding of solid coordination polymerization catalyst into the polymerization reactor has proven very problematic. The condition for a stabile polymerization process and a good polymerization product is an accurate and undisturbed catalyst feeding system. Many companies have patented catalyst feeding systems. So, FI 68630 WO 85/02851 discloses a method and a device for adding continuously pulverous coordination catalyst into a pressurized reactor. In the method a mixture of the catalysator and a wax, such as a polyethene wax, is pumped by means of an inert medium, such as heptane, into the polymerization reactor. The dosage problem has thus been solved by using a medium decreasing the hard flowability. When decreasing the viscosity the danger is, however, the separation of the solid and heavy catalyst, which results in a bad dosage accuracy.

The present invention concerns with the provision of a dosage method for a fluid substance having a great dosage accuracy and reliability of operation, particularly when dosing hard flowing substance. The invention is, furthermore, concerned with the provision of a method for dosing of a coordination catalyst into an olefin polymerization reactor, particularly a pressurized reactor. These aims have now been achieved by the new method for the dosing fluid substance, which is principally characterized by what is stated in the characterizing clause of claim 1.

Thus, it has been realized that the dosage pump can be provided with a freely travelling and tightly between the inner mantle surface of the cylinder and the outer mantle surface of the piston arranged intermediate pipe having a transmission opening adjustable upon the inlet and outlet opening of the piston-swept space. According to the new method the opening and closing of the inlet and outlet openings in the piston-swept space of the cylinder is carried out by freely rotating the intermediate pipe mentioned so that its transmission opening overlaps either the inlet or the outlet opening, whereby the whole surface of the intermediate pipe always covers either one of the inlet and outlet openings.

The invention is thus related to a new kind of dosage pump comprising a cylinder, a back and forth moving piston limiting the piston-swept space of the cylinder, whereby the piston-swept space is provided with openable inlet and outlet openings, and a freely travelling intermediate pipe arranged tightly between the cylinder and the piston having a transmission opening removable upon the inlet and outlet openings mentioned.

The dosage pump according to the method of the present invention can be any cylinder pump having inlet and outlet openings in its piston-swept space limited by the piston, Accordingly, both single- or double-acting cylinders and cylinders connected in series or in parallel can be used. The piston can be e.g. a piston movable mechanically by means of a spindle or a piston movable by a hydraulic substance.

The inlet and outlet openings of the piston-swept space of the piston can, in principle, be located in any wall of the cylinder part limiting the piston-swept space. According to one embodiment the inlet and outlet openings are located in the mantle part of the cylinder and the transmission opening in the mantle of the intermediate pipe. It is preferable that the openings mentioned are essentially in the same, to the cylinder axis vertical plane whereby they meet when rotating the intermediate pipe around its axis. According to one embodiment there are several inlet and/or outlet openings in the piston-swept space and several transmission openings of the intermediate pipe. Several openings make it possible that catalyst can simultaneously be dosed by the same pump into several reactors.

As the intermediate pipe has been tightly arranged between the inner mantle surface of the cylinder and the outer mantle surface of the piston, it can, in principle, be moved in the direction of the axis of the cylinder and/or rotated in the direction of its circumference. A condition for a rotational motion in the direction of the circumference of the cylinder is that the opposite surfaces of the cylinder, the piston and the intermediate pipe have the form of concentric straight circular cylinders.

According to the most preferable embodiment the cylinder, piston and intermediate pipe are round and concentric and their openings are located substantially on the circumference encircling the axis of the cylinder. Hereby the inlet and outlet openings are easily openable and closable by simply rotating the intermediate pipe around its axis.

The device steering the intermediate pipe is, according to one embodiment of the invention, arranged into contact with the operation-side or front end of the cylinder. Hereby it is preferable that the steering device of the intermediate pipe is planned to turn the intermediate pipe around its axis in the above-described manner.

In order to decrease the friction and provide sealing the intermediate pipe can be separated from the cylinder by slide sealing and a sealing liquid space. Also the piston can be separated from the intermediate pipe by slide sealings and a sealing liquid space. Both sealing liquid spaces can be furnished with aggregates going through the cylinder. If solid particles of the liquid to be fed enters from the piston-swept space into the sealing liquid spaces, they can be rinsed clean through the aggregates. The circulation of the sealing liquid can hereby also be arranged to take place occasionally or continuously. In the polymerization process of olefins hydrocarbon wax of the catalyst can be used as the sealing liquid so that in the sealing liquid space the pressure is greater than in the piston-swept space of the cylinder. The dosage pump can, moreover, be furnished with a heating mantle for the regulation of the viscosity of the substance to be pumped.

The size, shape and number of the inlet, outlet and transmission openings are optional. In small dosage pumps at least the shape of the transmission opening is preferably oval in order to maximize the feed surface area and minimize the clogging risk.

The invention relates to a method for dosing fluid substance. The method is particularly suitable for dosing high-viscous substances.

The run of the method or its cycle is typically the following: in the beginning the inlet opening located in the piston-swept space of the cylinder of the dosage pump is opened by moving the intermediate pipe arranged tightly between the cylinder and the piston so that the transmission opening in it removes upon the inlet opening. Then fluid substance is sucked to the piston-swept space of the cylinder through the open inlet opening by means of the back motion of the piston until the piston-swept space limited by the cylinder and the piston corresponds to the amount of the substance to be dosed. The outlet opening is opened by moving the intermediate pipe mentioned in order to remove its transmission opening upon the outlet opening, whereby the inlet opening simultaneously becomes closed when it is covered by the whole intermediate pipe surface. After that a prescribed amount of fluid substance is pressed from the piston-swept space to the space fed through the outlet opening, e.g. to the polymerization reactor, by means of a forward motion of the piston, after which the outlet opening is closed by moving the intermediate pipe so as to remove the transmission opening from the outlet opening.

In the method according to the invention the intermediate pipe is preferably moved so that its transmission opening rotates the axis of the cylinder. The intermediate pipe can advantageously be steered by a steering device arranged into contact with the operation-side end of the cylinder.

The method according to the invention for dosing fluid liquid is preferably used in connection with the polymerization of olefins when dosing solid coordination catalyst into a polymerization reactor. The dosage is preferably preceded by a mixing stage, in which the catalyst is mixed with the wax, and a feeding stage, in which the mixed liquid catalyst-wax-mixture is fed to the dosage pump. The method is particularly suitable for high-pressure polymerization of olefins since its dosage accuracy and reliability of operation are preserved in spite of the high pressure. For the sealing and lubrication of the dosage pump liquid, preferably the above-mentioned wax, is preferably conducted between the cylinder and the intermediate pipe and/or between the intermediate pipe and the piston.

The dosage pump and method according to the invention are suitable for the viscosity range of a fluid substance varying from 0.1 to 500,000 mPas. The dosage capacity of the pump may vary between 0.001 and 8,000 l/h/cylinder, the suction pressure between 0 and 350 bar, the feed pressure between 0 and 350 bar and the operating temperature between 0° and 700° C. whereby its dosage accuracy is of the size class 0.01%.

Figure 2:
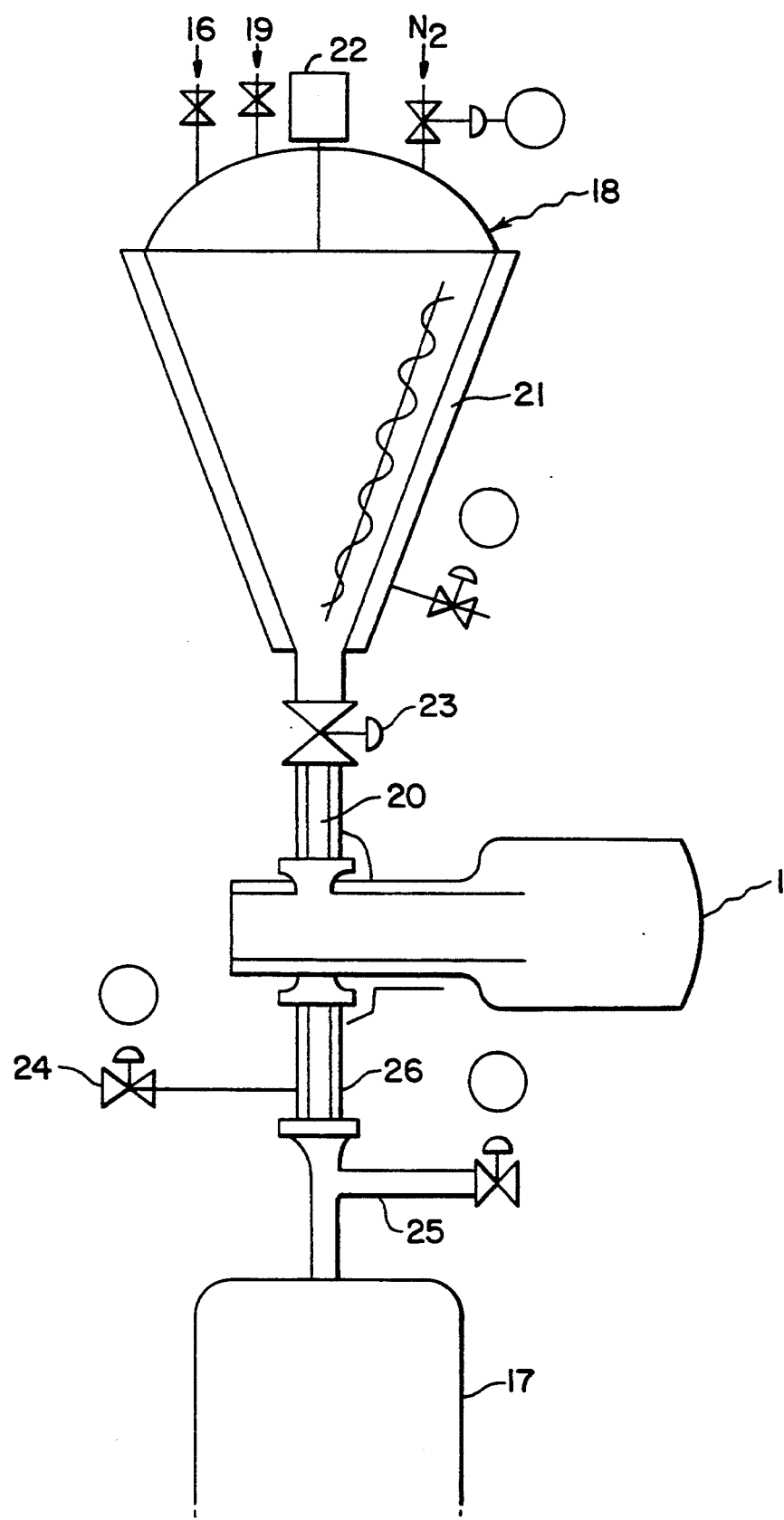

In the following the invention is illustrated more closely by pictures and descriptions depicting one of its embodiments, in which FIG. 1 depicts a section of a dosage pump according to one embodiment of the method of the invention and FIG. 2 depicts a diagram of the method according to one of the embodiments for dosing fluid substance with a dosage pump according to the invention.

FIG. 3 depicts the process flow diagram for introduction of the dosing fluid to a polymerization reactor.

The dosage pump 1 according to the embodiment depicted in FIG. 1 comprises a cylinder 2 and a piston 4 moving back and forth inside it, which simultaneously limits together with the inner surfaces of the cylinder the piston-swept space 3 furnished with an openable inlet opening 5 leading thereto and an outlet opening 6.

Between the inner mantle surface of the cylinder 2 and the outer mantle surface of the piston 4 has been movably and with respect thereto tightly arranged an intermediate pipe 7. The intermediate pipe 7 extends from the back end of the cylinder 2 in the direction of the axis at least to the point, in which the operation-side end of the piston 4 is located when the piston 4 is in its extreme 15 back position. The cylinder 2, the piston 4 and the intermediate pipe 7 form a concentric circular cylinder system. The intermediate pipe 7 has a transmission opening 8, which by rotation of the intermediate pipe 7 around its axis, moves upon the inlet opening 5 or the outlet opening 6 while the whole cylinder surface of the intermediate pipe 7 always covers one of the openings of the piston-swept space.

The intermediate pipe 7 is rotated around its axis by means of the steering device 9, which is arranged into contact with the operation-side or front end 10 of the cylinder 2.

For the sealing of the system there are the slide sealings 11 and the sealing liquid space 12 between the intermediate pipe 7 and the cylinder 2. Also between the piston 4 and the intermediate pipe 7 there are the slide sealings 13 and the sealing liquid space 14.

The dosage pump 1 operates so that the inlet opening 5 in the piston-swept space 3 of the cylinder 2 is opened by rotating the intermediate pipe 7 arranged between the cylinder 2 and the piston 4 so that the transmission opening 8 of it moves upon the inlet opening 5, the whole surface of the intermediate pipe 7 covering the outlet opening 6.

To the piston-swept space 3 is sucked the fluid substance to be dosed through the inlet opening 5 by means of a back motion of the piston 4 until the piston-swept space 3 is filled with the desired amount of the fluid substance to be dosed. Then the outlet opening 6 in the piston-swept space 3 is opened by rotating the intermediate pipe 7 arranged tightly between the cylinder 2 and the piston so that the transmission opening 8 moves upon the outlet opening 6, the whole surface of the intermediate pipe 7 covering the inlet opening 5.

Then hard-flowing substance to be dosed is pressed from the piston-swept space 3 through the outlet opening 6 by means of a forward motion of the piston 4 to the space, to which the flowing substance is intended to be dosed. Finally, the outlet opening 6 is closed. The above-described method can be used for the feeding of detached doses or it can be used as a cycle of automatic or semiautomatic pumping.

FIG. 2 depicts the use of the dosage pump 1 according to the invention for the dosing of catalyst 16 into the olefin polymerization reactor 17. The equipment comprises the mixing vessel 18 of the catalyst 16 and the wax 19, which is furnished with dosing valves of the substances mentioned, a supply valve for nitrogen, a heating mantle 21, a mixer 22 and a back-flow valve 23. The back-flow valve 23 of the mixing vessel 18 is connected through pipe 20 to the dosage pump 1 according to the invention, which preferably is a dosage pump 1 according to FIG. 1. The dosage pump 1 is connected through pipe 26 furnished with a valve and a flushing branch 25 to the polymerization reactor 17.

The feeding system of the solid catalyst of the olefin polymerization according to FIG. 2 operates so that to the mixing vessel 18 filled with pure nitrogen is fed solid catalyst 16 and suspending wax 19, after which these components are mixed by means of the mixer 22 and the heating mantle 21 to a homogeneous suspension.

When a homogeneous mixture of the catalyst 16 and the wax 19 is created, the valve 23 is opened and the mixture transfers through pipe 20 to the dosage pump 1, which in the above-described manner and with great dosage accuracy and reliability of operation feeds the mixture of the catalyst 16 and the wax 19 to the polymerization reactor. In this manner a better feed of solid catalyst to the polymerization reactor of olefins than before is achieved.

The following process description comprises the preparation of the catalyst wax and its dosage continuously to a polymerization reactor of pilot or industrial scale. The process is described in FIG. 3. The catalyst feed equipment 27 according to FIG. 3 comprises the feeders 28 of the catalyst wax, the feeders 29 of the catalyst, the mixing containers 30 of the catalyst and the catalyst wax, a piston pump 31, the feeders 32 of the cocatalyst and the donor, the feeder 33 of the reagents, into which leads the feeder 34 of the monomer or the medium, and finally the polymerization reactor 35.

The Preparation of the Catalyst Wax

To the inert mixing container 30 is dosed polyalphaolefin, the viscosity of which is 4 cSt, and 4.0% by weight of pulverous polyethene wax. The temperature is raised to 100° C., at which temperature the tactic polyethene dissolves into polyalphaolefin. The mixture is agitated constantly. Simultaneously, nitrogen is led to the container 30 through its lower part, so that possible impurities may be stripped away from the mixture. The nitriding is continued for at least 2 hours. Then the temperature of the mixture is decreased to 70° C., whereby its viscosity is 70–80 cp. To prevent foaming the gases can be removed from the mixture by means of a vacuum treatment lasting about 1 hour. After this catalyst is added to the mixture by means of nitrogen pressure through the catalyst feeder 29 so that the content becomes 50 g/l, if a pilot polymerization reactor is in question. In industrial scale the content of 150 g/l can be used.

After the addition of the catalyst the vacuum and the nitrogen feed are still connected. After about one hour the vacuum is removed and the reactor is pressurized to a pressure of about 10 bars.

The mixture is mixed at a temperature of 70° C. for 3 hours, after which the temperature is decreased gradually to about 20° C., whereby the viscosity of the catalyst wax is 4500 cp. The agitation is decreased so no gas bubbles will be created in the mixture. A sample is taken from the catalyst wax to check the content. The preparation of the catalyst wax can also be connected directly with activation process of the catalyst, whereby the ready catalyst is mixed into the catalyst wax.

The Dosage of the Catalyst Wax into the Polymerization Reactor

The catalyst wax is then conducted by means of pressure along nitrided pipes (at least 12 mm) into piston pipe 31, which is not provided with a valve. The pump is one according to the present invention and the length of stroke is adjusted so that the catalyst transfers suitably in regard to the process conditions. Under pilot conditions the feed amount is about 20 ml and in industrial scale about 3400 ml of catalyst wax per hour, when the above-mentioned concentrations are used. If the catalyst wax is prepared of prepolymerized catalyst, the amounts are 4 to 5 fold.

The donor, of which there is 5% by volume, and the cocatalyst, of which there is 10% by volume, are dosed through feeders 32 preferably by pumps of their own so that they are first connected to one and the same pipe and then to the feeder of the catalyst wax. The donor and the cocatalyst can also be conducted to the reactor by the same pump as the catalyst, if there is a suction opening in the dosage pump separately for both substances. The pipes are measured so that the contact time between the donor and the cocatalyst is about 10 min. and the contact time between these and the catalyst is about 10 to 30 minutes.

Thus, after the piston pump there are no valves. The feed aggregate 33 is furnished with a pressure equalizer to prevent the pulsation. Furthermore, the feed aggregate 33 comprises a simple pipe mixer so that the contact of the reagents can be improved. The cooled monomer or medium is conducted through the feeder 34 to the forward end of the double-layered feed aggregate 33. At the end of the feeder of the catalyst reagents there is a nozzle of 0.90 mm, from which the monomer or medium picks up the catalyst. The feed aggregate 33, of which there can be several in spare, is furnished with nitriding, removal and oxygen measuring aggregates. It can also be closed from the reactor by means of a ball valve without stopping the polymerization.

Finally, the catalyst reagents and the monomers are fed in the desired order into the polymerization reactor 35, in which the monomers are polymerized by the aid of catalyst reagents to the desired product.

The benefits of the dosage pump and the dosage method according to the invention are the following:
- the equipment is simple and profitable as to its costs of investment,
- the dosage accuracy is theoretically as good as possible,
- the clogging risk of the system is insignificant since it does not comprise the conventional valves,
- the system can be applied also in pilot scale,
- great pressures can be used in the system so it is easily applicable to high-pressure processes.

We claim:

1. A method for the dosage of a fluidized polymerizing catalyst into a polymerization reactor by means of a dosage pump having a cylinder and a piston therein, said piston movable in a back-and-forth motion defining a piston-swept space, said piston-swept space including an inlet opening and an outlet opening, said cylinder including a freely rotating intermediate pipe arranged tightly between said cylinder and said piston and having at least one transmission opening therein, each of said cylinder and said piston having an axis, wherein the method comprises mixing polymerization catalyst with wax and feeding the flowing catalyst-wax mixture to the dosage pump, opening said inlet opening of said cylinder, drawing the flowing catalyst-wax mixture through said inlet opening by means of the back motion of said piston, closing said inlet opening and opening said outlet opening, pressing flowing catalyst-wax mixture from said piston-swept space through said outlet opening by means of the motion of the piston and closing said outlet opening, whereby the opening and closing of said inlet and outlet openings is carried out by rotating said intermediate pipe so that said at least one transmission opening in said intermediate pipe moves upon said inlet opening or said outlet opening, the whole intermediate pipe surface always covering one of said inlet or said outlet openings, conducting dosage pump sealing liquid for sealing and lubrication of said dosage pump between said cylinder and said intermediate pipe and between said intermediate pipe and said piston.

2. A method according to claim 1, wherein said cylinder includes a mantle portion, and a circumference and said intermediate pipe is moved so that said at least one transmission opening rotates on the axis of the cylinder to a point on the same circumference where are located the inlet and outlet openings of the mantle portion of the cylinder.

3. A method according to claim 1, wherein said intermediate pipe is steered by a steering device arranged in contact with the operation-side end of the cylinder.

4. A method according to claim 3 wherein said steering device of the intermediate pipe comprises a device rotating the intermediate pipe freely around its axis.

5. A method according to claim 1, wherein said cylinder has a surface facing said intermediate pipe, said intermediate pipe has a surface facing said piston, and said piston has an outwardly facing surface, each of said surfaces collectively referred to as opposite surfaces, said opposite surfaces are hydrostatic or respective sliding surfaces.

6. A method according to claim 2, wherein said intermediate pipe is steered by a steering device arranged in contact with the operation-side end of the cylinder.

7. A method according to claim 6, wherein said steering device of the intermediate pipe comprises a device circulating the intermediate pipe freely around its axis.

8. A method according to claim 2, wherein said cylinder has a surface facing said intermediate pipe, said intermediate pipe has a surface facing said piston, and said piston has an outwardly facing surface, each of said surfaces collectively referred to as opposite surfaces, said opposite surfaces are hydrostatic or respective sliding surfaces.

9. A method according to claim 3, wherein said steering device of the intermediate pipe comprises a device circulating the intermediate pipe freely around its axis.

10. A method according to claim 3, wherein said cylinder has a surface facing said intermediate pipe, said intermediate pipe has a surface facing said piston, and said piston has an outwardly facing surface each of said surfaces collectively referred to as opposite surfaces, said opposite surfaces are hydrostatic or respective sliding surfaces.

11. A method according to claim 4, wherein said cylinder has a surface facing said intermediate pipe, said intermediate pipe has a surface facing said piston, and said piston has an outwardly facing surface each of said surfaces collectively referred to as opposite surfaces, said opposite surfaces are hydrostatic or respective sliding surfaces.

12. The method of claim 1, wherein said sealing liquid comprises said wax.

13. The method of claim 12, wherein said sealing liquid includes mixing said polymerization catalyst with said wax.

14. The method of claim 13, wherein said catalyst is an oligomerization product of alpha-olefin.

15. The method of claim 13, wherein said sealing liquid is a mixture of alpha-olefin and polyethene wax.

* * * * *